(12) United States Patent
Lv et al.

(10) Patent No.: US 11,474,694 B2
(45) Date of Patent: Oct. 18, 2022

(54) DISPLAY CONTROL METHOD FOR SLIDING BLOCK IN TOUCH SCREEN

(71) Applicants: QINGDAO HAIER WASHING MACHINE CO., LTD., Shandong (CN); Haier Smart Home Co., Ltd., Shandong (CN)

(72) Inventors: Yanfen Lv, Qingdao (CN); Sheng Xu, Qingdao (CN); Jinzhu Deng, Qingdao (CN); Hai Shu, Qingdao (CN)

(73) Assignees: QINGDAO HAIER WASHING MACHINE CO., LTD., Qingdao (CN); Haier Smart Home Co., Ltd., Qingdao (CN)

( * ) Notice: Subject to any disclaimer, the term of this patent is extended or adjusted under 35 U.S.C. 154(b) by 0 days.

(21) Appl. No.: 17/293,684

(22) PCT Filed: Oct. 28, 2019

(86) PCT No.: PCT/CN2019/113623
§ 371 (c)(1),
(2) Date: May 13, 2021

(87) PCT Pub. No.: WO2020/098471
PCT Pub. Date: May 22, 2020

(65) Prior Publication Data
US 2021/0405866 A1 Dec. 30, 2021

(30) Foreign Application Priority Data
Nov. 13, 2018 (CN) .................. 201811347512.X

(51) Int. Cl.
*G06F 3/04817* (2022.01)
*G06F 3/04842* (2022.01)
(Continued)

(52) U.S. Cl.
CPC ...... *G06F 3/04886* (2013.01); *G06F 3/04817* (2013.01); *G06F 3/04842* (2013.01); *G06F 3/167* (2013.01)

(58) Field of Classification Search
None
See application file for complete search history.

(56) References Cited

U.S. PATENT DOCUMENTS 4,676,077 A * 6/1987 Hirooka ............... D06F 37/42
68/133
5,279,134 A * 1/1994 Nonogaki ............ G05B 19/108
68/12.27
(Continued)

FOREIGN PATENT DOCUMENTS

CN 103034399 A 4/2013
CN 103412709 A 11/2013
(Continued)

OTHER PUBLICATIONS

International Search Report and Written Opinion dated Feb. 6, 2020 in corresponding International Application No. PCT/CN2019/113623; 12 pages.

*Primary Examiner* — Jordany Nunez
(74) *Attorney, Agent, or Firm* — Maier & Maier, PLLC

(57) ABSTRACT

A display control method for a sliding block in a touch screen. The display control method includes: determining whether a sliding block is in a static state; detecting a region, in a touch screen, where the sliding block is located; setting the icon of the sliding block according to the detection result and the state of the sliding block; if the sliding block is currently in a static state, determining whether a touch point of the touch screen is on the sliding block, and if yes, displaying the icon of the sliding block in brightened fashion; if the sliding block is currently in a static state and the touch point is on the sliding block, playing a touch prompt (Continued)

tone; and detecting whether the sliding block is being dragged, and if yes, playing a drag prompt tone.

9 Claims, 4 Drawing Sheets

(51) Int. Cl.
*G06F 3/01* (2006.01)
*G06F 3/04886* (2022.01)
*G06F 3/16* (2006.01)

(56) References Cited

U.S. PATENT DOCUMENTS

| | | | | |
|---|---|---|---|---|
| 5,694,793 A * | 12/1997 | Nishimura | ............. | D06F 34/32 68/12.27 |
| 5,754,174 A * | 5/1998 | Carpenter | ............. | G06F 3/0481 715/810 |
| 6,169,964 B1 * | 1/2001 | Aisa | ............. | D06F 34/28 702/136 |
| 6,626,013 B2 * | 9/2003 | Ohta | ............. | D06F 34/32 68/12.27 |
| 6,671,916 B2 * | 1/2004 | Herr | ............. | D06F 34/28 68/12.27 |
| 7,246,395 B2 * | 7/2007 | Buckroyd | ............. | D06F 34/28 68/12.27 |
| 7,428,445 B2 * | 9/2008 | Lee | ............. | D06F 34/28 68/12.27 |
| 8,887,049 B2 * | 11/2014 | Kim | ............. | H04N 21/478 715/721 |
| 9,303,350 B2 * | 4/2016 | Park | ............. | D06F 34/32 |
| 10,122,542 B2 * | 11/2018 | Mercelat | ............. | G06F 3/0488 |
| 10,851,487 B2 * | 12/2020 | Hoppe | ............. | D06F 34/32 |
| 10,988,882 B2 * | 4/2021 | Hoppe | ............. | D06F 34/30 |
| 11,098,428 B2 * | 8/2021 | Adams | ............. | D06F 33/37 |
| 2003/0184597 A1 * | 10/2003 | Jo | ............. | D06F 34/32 715/810 |
| 2004/0134238 A1 * | 7/2004 | Buckroyd | ............. | D06F 34/32 68/12.23 |
| 2009/0292993 A1 * | 11/2009 | Ulrich | ............. | G06F 3/0481 715/727 |
| 2012/0056827 A1 * | 3/2012 | Kim | ............. | D06F 34/32 345/173 |
| 2014/0236320 A1 * | 8/2014 | Sasaki | ............. | H04L 12/282 700/83 |
| 2015/0000025 A1 * | 1/2015 | clements | ............. | G06V 40/168 4/443 |
| 2015/0345068 A1 * | 12/2015 | Coffman | ............. | G06F 3/0482 715/771 |
| 2017/0061521 A1 * | 3/2017 | Lee | ............. | G06F 3/04842 |

FOREIGN PATENT DOCUMENTS

| | | |
|---|---|---|
| CN | 104221358 A | 12/2014 |
| CN | 105938412 A | 9/2016 |

* cited by examiner

DISPLAY CONTROL METHOD FOR SLIDING BLOCK IN TOUCH SCREEN

TECHNICAL FIELD

The present disclosure relates to the technical field of display control, and more particularly, to a display control method for a sliding block in a touch screen.

BACKGROUND

A touch screen is an input device in a human-machine interaction application, and unlike a keyboard or a mouse, the touch screen allows direct operation of selection thereon. For example, users of communication devices such as touch-screen mobile phones and personal digital assistants can directly input by handwriting, which features simple and visually perceptive. A touch screen is more user-friendly than a keyboard or a mouse in inputting and costs less in terms of a control chip, hence the touch screen is getting more applicable.

An icon of a sliding block in a touch screen of an existing household appliance, a mobile terminal and other devices features typically a simple rectangle or a circle, invariable in different states, either static or moving, or in different regions, uninteresting at all. Besides, the icon is generally small and difficult to operate for users with poor eyesight or clumsy fingers.

In light of this, the present application is provided herein.

SUMMARY

It is an object of the present disclosure to solve the problems in the prior art by providing a display control method for a sliding block in a touch screen, which enables both a more entertaining operation of the sliding block and an improved degree of recognition of the state of the sliding block A display control method for a sliding block in a touch screen is provided herein, including:

determining whether the sliding block is in a static state; and setting an icon of the sliding block selectively according to a determination result.

Preferably, the step of setting an icon of the sliding block selectively according to a determination result specifically includes:

setting the icon of the sliding block as a first icon if the sliding block is currently in the static state; and setting the icon of the sliding block as a second icon if the sliding block is currently in a moving state.

Preferably, the first icon and/or the second icon is an icon prestored in a device having the touch screen or an icon uploaded by a user.

Preferably, before the step of setting an icon of the sliding block selectively according to a determination result, the method further includes:

detecting a region where the sliding block is located in the touch screen;

where, accordingly, the step of setting an icon of the sliding block selectively according to a determination result specifically includes setting the icon of the sliding block according to a detection result and the state of the sliding block.

Preferably, N regions are preset in the touch screen, and the step of setting the icon of the sliding block according to the detection result and the state of the sliding block specifically includes:

setting the icon of the sliding block as a $P_n^1$ icon if the sliding block is in an n-th region and in the static state;

setting the icon of the sliding block as a $P_n^2$ icon if the sliding block is in an n-th region and in the moving state;

where n=1, 2, . . . , N; and $P_n^1$ and $P_n^2$ are the first and second icons in a corresponding group of icons in the preset n-th region, respectively.

Preferably, the $P_n^1$ icon and/or the $P_n^2$ icon is an icon prestored in the device having the touch screen or an icon uploaded by the user.

Preferably, after the step of setting the icon of the sliding block according to the detection result and the state of the sliding block, the method further includes:

determining whether a touch point of the touch screen is on the sliding block if the sliding block is currently in the static state, and if yes, displaying the icon of the sliding block in a brightened fashion.

Preferably, the method further includes:

playing a touch prompt tone if the sliding block is currently in the static state and the touch point is on the sliding block.

Preferably, the method further includes:

detecting whether the sliding block is being dragged, and if yes, playing a drag prompt tone.

Preferably, the touch prompt tone and/or the drag prompt tone is a prompt tone prestored in the device having the touch screen or a prompt tone uploaded by the user.

The present disclosure is more advantageous than the prior art in that:

According to the display control method for the sliding block in the touch screen, different icons are used for displaying the sliding block in the static state and the moving state, and different icons can be set for the sliding block by detecting the region where the sliding block is currently located in conjunction with the static state or the moving state. Besides, when a user touches the sliding block, the icon of the sliding block can be displayed in a brightened fashion and/or the touch prompt tone can be tuned up; when the sliding block is detected to have been dragged, the drag prompt tone can be turned up. Such a method enables both a more entertaining operation of the sliding block and an improved degree of recognition of the state of the sliding block, therefore, a user who has poor eyesight or is clumsy with his/her fingers is facilitated in determining whether his/her finger is touching the sliding block or dragging the sliding block to move.

DETAILED DESCRIPTION

Preferred embodiments of the present application will now be described with reference to the accompanying drawings. It should be understood by those skilled in the art that these embodiments are merely illustrative of the technical principles of the application and are not intended to limit the scope of the application.

It is to be noted that in the description of the present application, the terms "first" and "second" are used merely for convenience of description and do not indicate or imply a relative importance of the described devices, elements or parameters and are therefore not to be construed as limiting the present application.

Figure 1:
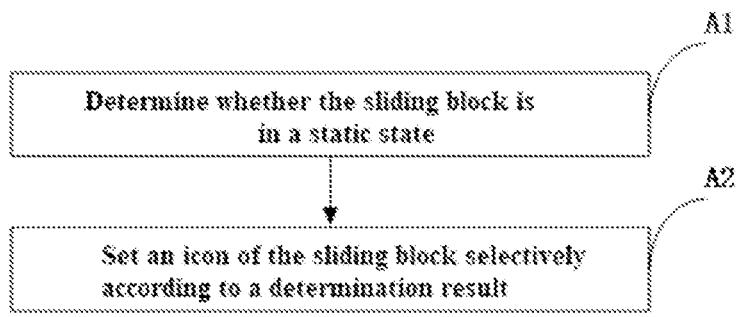
FIG. 1 is a schematic diagram showing major steps of an embodiment 1 of a display control method for a sliding block in a touch screen according to the present disclosure.

FIG. 1 is a schematic diagram showing major steps of an embodiment 1 of a display control method for a sliding block in a touch screen according to the present disclosure. As shown in FIG. 1, the method of this embodiment includes steps A1 and A2 of:

step A1, determining whether the sliding block is in a static state; and step A2, setting an icon of the sliding block selectively according to a determination result. This step specifically includes steps A 21 and A 22 of:

step A21, setting the icon of the sliding block as a first icon if the sliding block is currently in the static state; and step A22, setting the icon of the sliding block as a second icon if the sliding block is currently in a moving state.

For example, the icon of the sliding block is set as a conventional rectangle or a logo of a manufacturer if the sliding block is in the static state, and as a cartoon-bee or other patterns favored by the user if the sliding block is in the moving state, which will undoubtedly enables a more entertaining operation.

Herein, the first icon and/or the second icon is an icon prestored in the device having the touch screen or an icon uploaded by the user.

Figure 2:
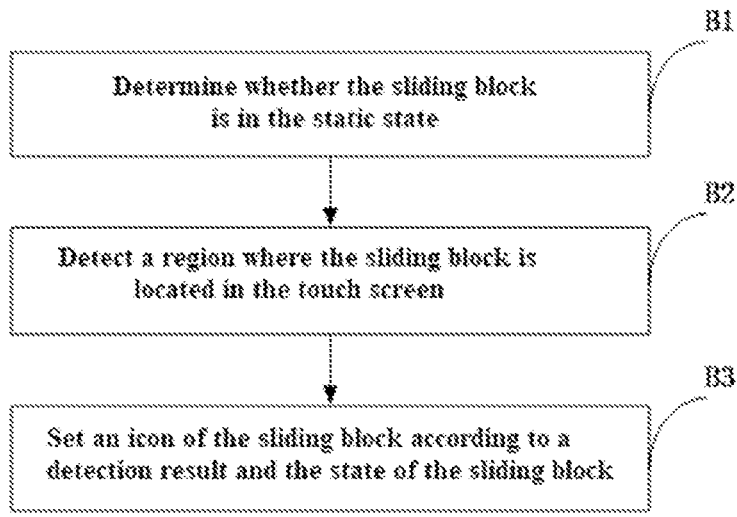
FIG. 2 is a schematic diagram showing major steps of an embodiment 2 of the display control method for a sliding block in a touch screen according to the present disclosure.

FIG. 2 is a schematic diagram showing major steps of an embodiment 2 of the display control method for a sliding block in a touch screen according to the present disclosure. As shown in FIG. 2, the method of this embodiment includes steps B1 to B4 of:

step B1, determining whether the sliding block is in the static state step B2, detecting a region where the sliding block is located in the touch screen; and step B3, setting the icon of the sliding block according to a detection result and the state of the sliding block.

In this embodiment, N regions are preset in the touch screen, and the icons of the sliding block are correspondingly pre-divided into N groups of icons, where each group corresponding to a region and includes two icons which are respectively used for the static state and the moving state.

Step B3 may specifically include:

setting the icon of the sliding block as a $P_n^1$ icon if the sliding block is in an n-th region and in the static state; setting the icon of the sliding block as a $P_n^2$ icon if the sliding block is in the n-th region and in the moving state.

where n=1, 2, . . . , N; and $P_n^1$ and $P_n^2$ are the first and second icons in a corresponding group of icons in the preset n-th region, respectively. The $P_n^1$ icon and/or the $P_n^2$ icon is an icon prestored in the device having the touch screen or an icon uploaded by the user.

A touch screen of a washing machine is taken as an example to describe the setting of the "region" and the method for setting the icon of the sliding block in this embodiment.

Figure 3:
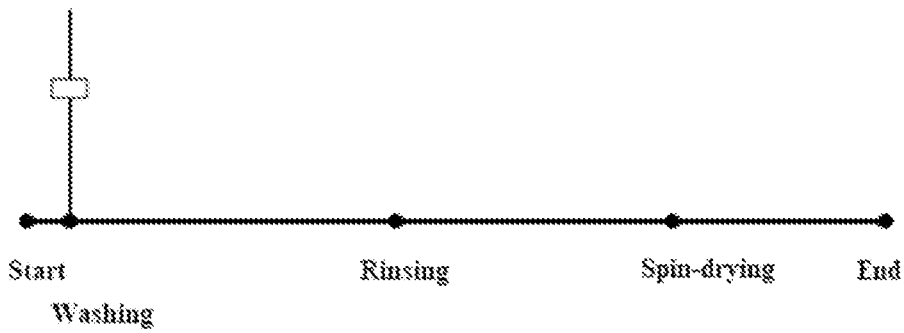
FIG. 3 is a schematic view showing a use scenario of the sliding block when a device having the touch screen is a washing machine.

FIG. 3 is a schematic view showing a use scenario of the sliding block when a device having the touch screen is a washing machine. As shown in FIG. 3, several basic display nodes are arranged on a horizontal progress bar, including a "Start" display node on the left end of the progress bar, an "End" display node on the right end of the progress bar, and washing process display nodes between the "Start" and "End" display nodes, including "Washing", "Rinsing", and "Spin-drying".

In the process of setting parameters, parameters can be modified specifically by dragging the sliding block for "Washing", "Rinsing", and "Spin-drying", and a scene of setting the "Washing" parameter is shown in FIG. 3. In the operation of the washing machine, during the operation process of the washing machine, "Start" is used for indicating a time point at which the washing machine starts to operate, and "End" is used for indicating a time point at which the washing machine ends operating; a sliding block on the progress bar between "Washing" and "Rinsing" means that the current state is washing, and a sliding block between "rinsing" and "Spin-drying" means that the current state is rinsing, and a sliding block between "Spin-drying" and "End" means that the current state is spin-drying. Therefore, when the parameters of "Washing", "Rinsing" and "Spin-drying" are set, the regions of the sliding block can be set as a first region, a second region, and a third region, respectively, and the regions corresponding to the washing state, the rinsing state and the spin-drying state on the progress bar are set as a fourth region, a fifth region, and a sixth region, respectively. Herein, each region corresponds to one group of icons, where two icons are preset in each group, one used for the static state, and the other used for the moving state. Apparently, some or all of these icons may be the same, depending on the preferences of the user. For users with poor eyesight or clumsy fingers, a larger icon may also be selected. Some of these icons may be prestored in advance for a user to select when the washing machine leaves the factory, and it's also allowable for the user to upload his/her favored icons through Bluetooth, WIFI, USB, or the like.

Figure 4:
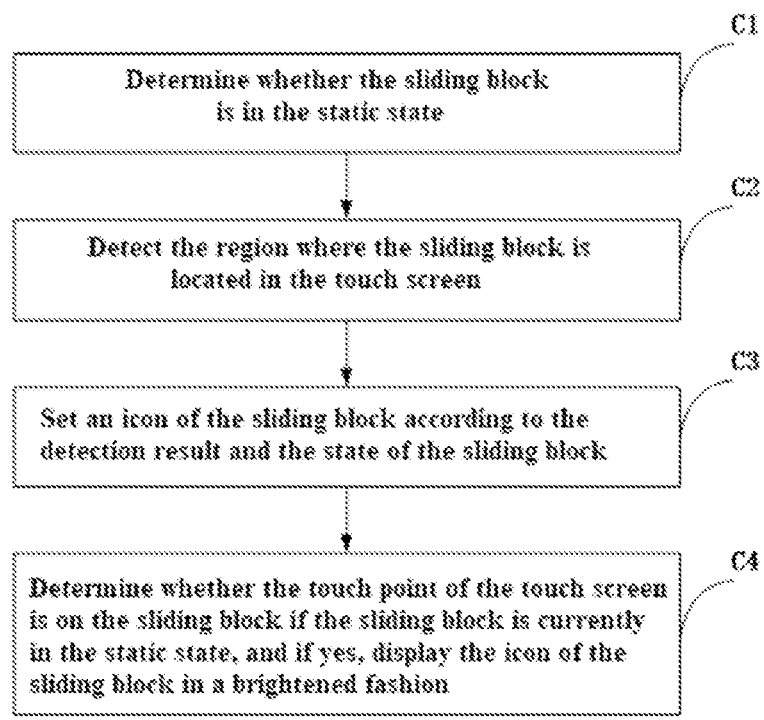
FIG. 4 is a schematic diagram showing major steps of an embodiment 3 of the display control method for a sliding block in a touch screen according to the present disclosure.

FIG. 4 is a schematic diagram showing major steps of an embodiment 3 of the display control method for a sliding block in a touch screen according to the present disclosure. As shown in FIG. 4, the method of this embodiment includes steps C1 to C4 of:

step C1, determining whether the sliding block is in the static state;

step C2, detecting the region where the sliding block is located in the touch screen;

step C3, setting the icon of the sliding block according to the detection result and the state of the sliding block; and step C4, determining whether the touch point of the touch screen is on the sliding block if the sliding block is currently in the static state, and if yes, displaying the icon of the sliding block in a brightened fashion.

Herein, steps C1 to C3 are the same as steps B1 to B3 in FIG. 2, and will not be described again. In step C4, when the user is ready to drag the sliding block for parameter setting, the touch point is right on the sliding block as the user points at the sliding block on the screen, and the icon of the sliding block is displayed in a brightened fashion, so that the user can immediately realize that the position he/she touched is accurate, otherwise, the user can adjust the position of his/her finger appropriately if the icon is not displayed in a brightened fashion.

Figure 5:
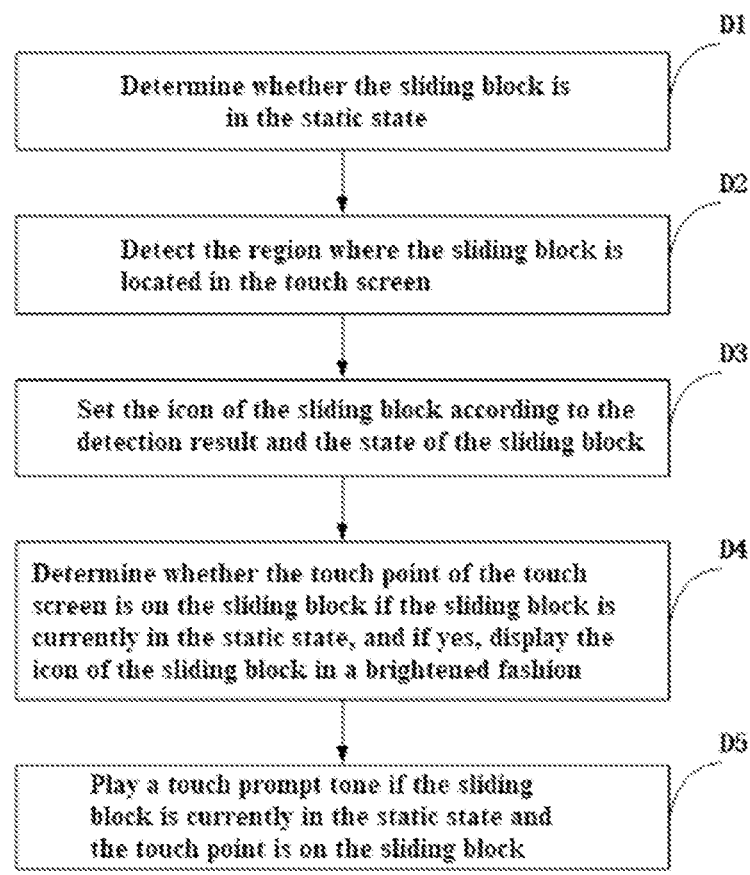
FIG. 5 is a schematic diagram showing major steps of an embodiment 4 of the display control method for a sliding block in a touch screen according to the present disclosure.

FIG. 5 is a schematic diagram showing major steps of an embodiment 4 of the display control method for a sliding block in a touch screen according to the present disclosure. As shown in FIG. 5, the method of this embodiment includes steps D1 to D5 of:

step D1, determining whether the sliding block is in the static state;

step D2, detecting the region where the sliding block is located in the touch screen;

step D3, setting the icon of the sliding block according to the detection result and the state of the sliding block;

step D4, determining whether the touch point of the touch screen is on the sliding block if the sliding block is currently in the static state, and if yes, displaying the icon of the sliding block in a brightened fashion; and step D5, playing a touch prompt tone if the sliding block is currently in the static state and the touch point is on the sliding block.

Herein, steps D1 to D4 are the same as steps C1 to C4 in FIG. 4, and will not be described again. The touch prompt tone played in step D5 can be a prompt tone prestored in the device having the touch screen or a prompt tone uploaded by the user. For a user with poor eyesight, the icon of the sliding block is displayed in a brightened fashion and the touch prompt tone can help the user further confirm whether the sliding block is touched by his/her finger.

Figure 6:
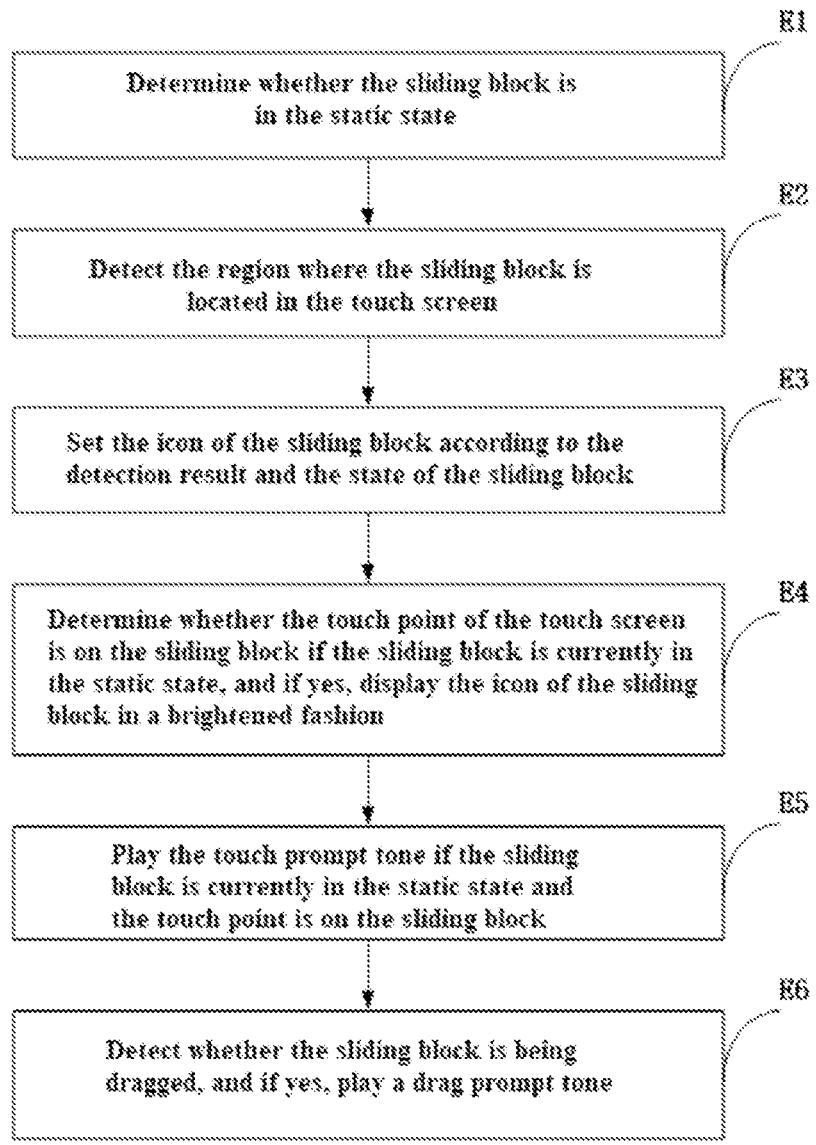
FIG. 6 is a schematic diagram showing major steps of an embodiment 5 of the display control method for a sliding block in a touch screen according to the present disclosure.

FIG. 6 is a schematic diagram showing major steps of an embodiment 5 of the display control method for a sliding block in a touch screen according to the present disclosure. As shown in FIG. 6, the method of this embodiment includes steps E1 to E6 of:

step E1, determining whether the sliding block is in the static state;

step E2, detecting the region where the sliding block is located in the touch screen;

step E3, setting the icon of the sliding block according to the detection result and the state of the sliding block;

step E4, determining whether the touch point of the touch screen is on the sliding block if the sliding block is currently in the static state, and if yes, displaying the icon of the sliding block in a brightened fashion;

step E5, playing the touch prompt tone if the sliding block is currently in the static state and the touch point is on the sliding block; and step E6, detecting whether the sliding block is being dragged, and if yes, playing a drag prompt tone.

Herein, steps E1 to E5 are the same as steps D1 to D5 in FIG. 5, and will not be described again. The drag prompt tone played in step E6 can be a prompt tone prestored in the device having the touch screen or a prompt tone uploaded by a user.

For example, in the case of the sliding block on the progress bar in the touch screen of the washing machine, the prompt tone may not be played when the sliding block moves normally with the washing progress, but the drag prompt tone may be played when the user drags the sliding block to change the washing progress. For example, the drag prompt tone may be set to sound like airplane noise, which enables a more entertaining experience, and a user with poor eyesight or clumsy fingers can thus be assisted to confirm whether his/her finger is dragging the sliding block to move.

Although the above embodiments are described with the steps in sequential order, it will be understood by those skilled in the art that these steps are not necessarily performed in such an order and rather may be performed simultaneously (in parallel) or in a backward order to achieve the effects of the present embodiments, and these simple variations are within the scope of the present application.

Those skilled in the art will appreciate that the steps of the exemplary method described in connection with the embodiments disclosed herein may be implemented by using electronic hardware, computer software, or a combination of both, and that the elements and steps of the examples are described above generally in terms of their functionality to clearly illustrate this interchangeability of electronic hardware and software. Whether such functionality is implemented with electronic hardware or software depends upon the particular application and design constraints imposed on the particular implementation. Those skilled in the art may implement the described functionality in varying ways for each particular application, but such an implementation should not be construed as a departure from the scope of the present application.

The technical solution of the present application has been described with reference to the preferred embodiments shown in the accompanying drawings, but it will be readily understood by those skilled in the art that the scope of the present application is not limited to these specific embodiments. Those skilled in the art can make equivalent alterations or substitutions to the relevant features without departing from the principles of the application, and such alterations or substitutions are intended to fall within the scope of the application.

What is claimed is:

1. A display control method for a sliding block in a touch screen, comprising:
   determining whether the sliding block is in a static state;
   detecting a region where the sliding block is located in the touch screen; and
   setting an icon of the sliding block according to a detection result and a state of the sliding block,
   wherein N regions are preset in the touch screen, and the step of setting the icon of the sliding block according to the detection result and the state of the sliding block specifically comprises:
      setting the icon of the sliding block as a $P_n^1$ icon if the sliding block is in an n-th region and in the static state; and
      setting the icon of the sliding block as a $P_n^2$ icon if the sliding block is in the n-th region and in a moving state, and
   wherein n=1, 2, . . . , N and wherein $P_n^1$ and $P_n^2$ are first and second icons in a corresponding group of icons in the preset n-th region, respectively.

2. The display control method for a sliding block in a touch screen according to claim 1, wherein the setting of an icon of the sliding block further comprises:
   setting the icon of the sliding block as a first icon if the sliding block is currently in the static state; and
   setting the icon of the sliding block as a second icon if the sliding block is currently in the moving state.

3. The display control method for a sliding block in a touch screen according to claim 2, wherein the first icon and/or the second icon is an icon prestored in a device having the touch screen or an icon uploaded by a user.

4. The display control method for a sliding block in a touch screen according to claim 1, wherein the $P_n^1$ icon and/or the $P_n^2$ icon is an icon prestored in the device having the touch screen or an icon uploaded by the user.

5. The display control method for a sliding block in a touch screen according to claim 1, wherein after the setting of the icon of the sliding block according to the detection result and the state of the sliding block, the method further comprises:
   determining whether a touch point of the touch screen is on the sliding block if the sliding block is currently in the static state, and if yes, displaying the icon of the sliding block in a brightened fashion.

6. The display control method for a sliding block in a touch screen according to claim 5, further comprising:
   playing a touch prompt tone if the sliding block is currently in the static state and the touch point is on the sliding block.

7. The display control method for a sliding block in a touch screen according to claim 6, further comprising:
   detecting whether the sliding block is being dragged, and if the sliding block is detected as being dragged, playing a drag prompt tone.

8. The display control method for a sliding block in a touch screen according to claim 6, wherein the touch prompt tone and/or the drag prompt tone is a prompt tone prestored in the device having the touch screen or a prompt tone uploaded by the user.

9. The display control method for a sliding block in a touch screen according to claim 7, wherein the touch prompt tone and/or the drag prompt tone is a prompt tone prestored in the device having the touch screen or a prompt tone uploaded by the user.

\* \* \* \* \*